United States Patent [19]
Inkster

[11] Patent Number: 5,456,011
[45] Date of Patent: Oct. 10, 1995

[54] CUTTING TOOL

[75] Inventor: Kevin R. Inkster, Darlington, Australia

[73] Assignee: Arbortech Investments Pty. Ltd., Malaga, Australia

[21] Appl. No.: 107,732

[22] PCT Filed: Feb. 21, 1992

[86] PCT No.: PCT/AU92/00071

§ 371 Date: Oct. 12, 1993

§ 102(e) Date: Oct. 12, 1993

[87] PCT Pub. No.: WO92/14587

PCT Pub. Date: Sep. 3, 1992

[30] Foreign Application Priority Data

Feb. 21, 1991 [AU] Australia ................... PK4079

[51] Int. Cl.⁶ ....................................... B26B 19/00
[52] U.S. Cl. ............................. 30/293; 30/503.5
[58] Field of Search ..................... 30/502, 392, 393, 30/501, 503, 503.5; 125/19, 16.01; 51/170 TL, 175; 83/602, 599, 647

[56] References Cited

U.S. PATENT DOCUMENTS

| 770,094 | 9/1904 | McGill | 30/502 |
| 2,137,893 | 11/1938 | Elder | |
| 2,793,661 | 5/1957 | Olson | |
| 3,033,251 | 5/1962 | Atkinson et al. | 30/392 |
| 3,203,095 | 8/1965 | Nelson | |
| 3,388,470 | 6/1968 | Ufer | |
| 3,905,105 | 9/1975 | Tuke | |
| 3,978,862 | 9/1976 | Morrison | 30/393 |
| 4,379,362 | 4/1983 | Getts | 30/393 |

FOREIGN PATENT DOCUMENTS

| 546861 | 6/1993 | European Pat. Off. | 30/392 |
| 872857 | 12/1954 | Germany . | |

OTHER PUBLICATIONS

PCT Application WO89/03290, PCT/EP88/00926 filed Oct. 15, 1988.
Soviet Inventions Illustrated, Apr. 1973, Miscellaneous P6, SU 337270 (V. L. Chemical Inc. Plant Installation Technol. Des. Inst.) May 26, 1972.

Primary Examiner—Kenneth E. Peterson
Attorney, Agent, or Firm—Dorsey & Whitney

[57] ABSTRACT

A cutting tool comprising two cutting members positioned side by side and each having a toothed cutting edge of substantially the same shape. The cutting member being mounted on respect eccentrics of a drive shaft coupled to a motor. The cutting member being guided by respective control links so that the cutting edge of each cutting member prescribes simultaneously in the plane of the toothed edge, simultaneous oscillatory movements in the direction of the toothed edge and in the direction of right-angles thereto. The corresponding movements of the respective cutting members being out of the phase, preferably by 180° and the teeth of each cutting edge being adapted to each cut when moving individually in the direction of the toothed edge.

30 Claims, 3 Drawing Sheets

CUTTING TOOL

This invention relates to an improved cutting tool of the general type including a plurality of cutting teeth arranged along the edge of a member and generally referred to as a saw.

A range of cutting tools or saws are known wherein the cutting teeth are arranged along the straight edge of an elongate member or about the peripheral edge of a circular member. These saws are used for cutting a variety of materials although it is customary to provide individual cutting tools for respective groups of materials such as wood, metal and concrete or stone.

It is the principal object of the present invention to provide a cutting tool incorporating a plurality of cutting teeth along an edge of a member and wherein the cutting tool has improved performance in cutting a wide range of materials.

With this object in view, there is provided a cutting tool comprising two cutting members positioned side by side and each having a toothed cutting edge of substantially the same shape, each cutting member being drive coupled to a motor so the cutting edge thereof prescribes simultaneously in the plane of the toothed edge, simultaneous oscillatory movements in the direction of the toothed edge and in the direction at right angles thereto, said corresponding movements of the respective cutting members being out of phase, and the teeth of each cutting edge being adapted to each cut when moving individually in the direction of the toothed edge.

As a result of the cutting members being subject to simultaneous oscillatory movements in two directions, each tooth on the respective cutting member describes an oval or elliptical-like path so that during one half of the path the teeth engage the material to be cut and performs a cutting action, and during the other half, the tooth is lifted clear of the material being cut as the cutting element performs a return movement. As the oscillatory motions of the respective cutting members are out of phase, and preferably 180° out of phase, the teeth on one cutting member will be cutting the material whilst the teeth of the other member are undergoing the return movement. Conveniently, the toothed edge of each cutting member is of a curved, possibly arcuate, shape, and preferably at each end of the cutting member there is portion of the cutting edge which is more sharply curved than the major portion of the cutting edge.

Conveniently the pitch of the teeth on the cutting edge is less than the extent of oscillatory movement in the direction of the cutting edge, so that there is an overlap in the cutting movement of each adjacent tooth, whereby no part of the material being cut within the length of the cutting edge is not subject to a cutting action in each cycle of movement of the cutting members.

The required motion of the respective cutting members is obtained by rotatably supporting the cutting members on respective eccentric journals of a shaft rotatably driven by a motor. The cutting members are also pivotally connected to a link at a location spaced from the shaft axis and with a pivot axis parallel therewith. The pivot axis of the cutting members is spaced from the axis of the drive shaft so that as the drive shaft rotates, the cutting element will undergo an oscillatory motion about the pivot axis thereof, and that pivot axis will move substantially linearly in a direction generally normal to the direction of oscillation.

Expressed another way, the cutting member will oscillate about the pivot axis whilst that pivot axis will move substantially linearly along a line between the pivot axis and the axis of the drive shaft. The movement of the cutting member pivot axis provides the movement which cyclically lifts the cutting teeth out of engagement with the material to be cut, whilst the oscillatory motion performs the cutting and return actions of the cutting edge of the cutting member. As the oscillatory movements of the respective cutting members are out of phase, one cutting member is performing a cutting stroke while the other is on a return stroke.

The invention will be more readily understood from the following description of one practical arrangement of the invention as illustrated in the accompanying drawings.

Figure 1:
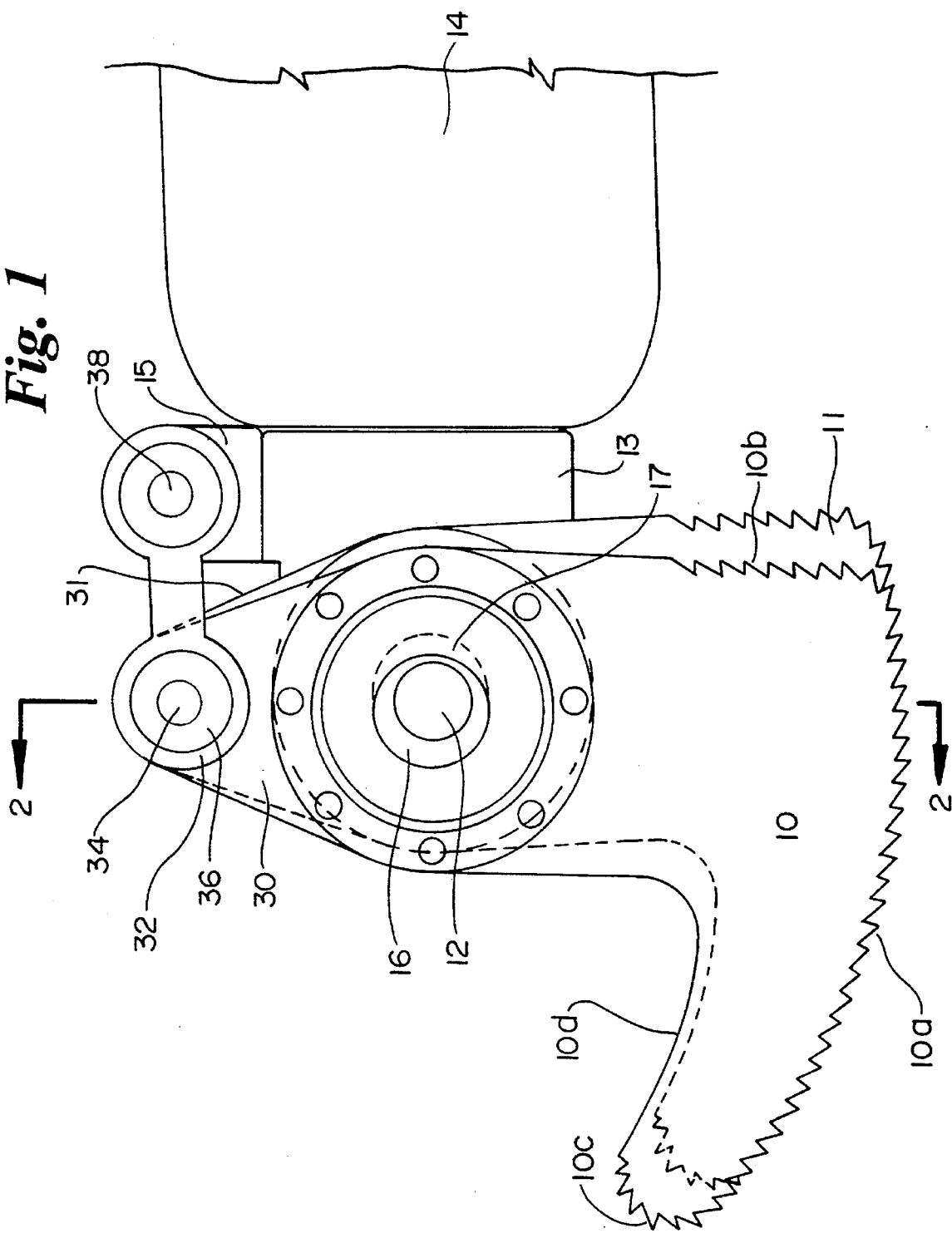
FIG. 1 is a side elevation of the cutting tool.

Referring now to FIG. 1 of the drawings, the cutting tool comprises two cutting members 10 and 11 supported on the drive shaft 12 driven through a suitable gear train (no shown) housed in the gearbox 13 and coupled to an electric motor (not shown) located in the housing 14. The housing 14 and the electric motor therein may be of the same construction as used in conventional hand held angle grinders. The gearbox 13 and the gear train therein may also be of the construction commonly used in angle grinders with the exception, that the gearbox housing 13 is provided with a mounting lug 15, the purpose of which will be further described hereinafter.

The drive shaft 12 has two eccentric journals 16 and 17 formed integral therewith or mounted thereon, in a side by side relation in the direction of the axis of the shaft 12. Each of the eccentrics 16 and 17 are of the same profile and eccentricity and are in a fixed 180° out of phase relation with respect to the axis of the drive shaft 12. The cutter members 10 and 11 have respective bearing assemblies 20 and 21 mounted therein and rotatably supported on the respective eccentrics 16 and 17.

Figure 2:
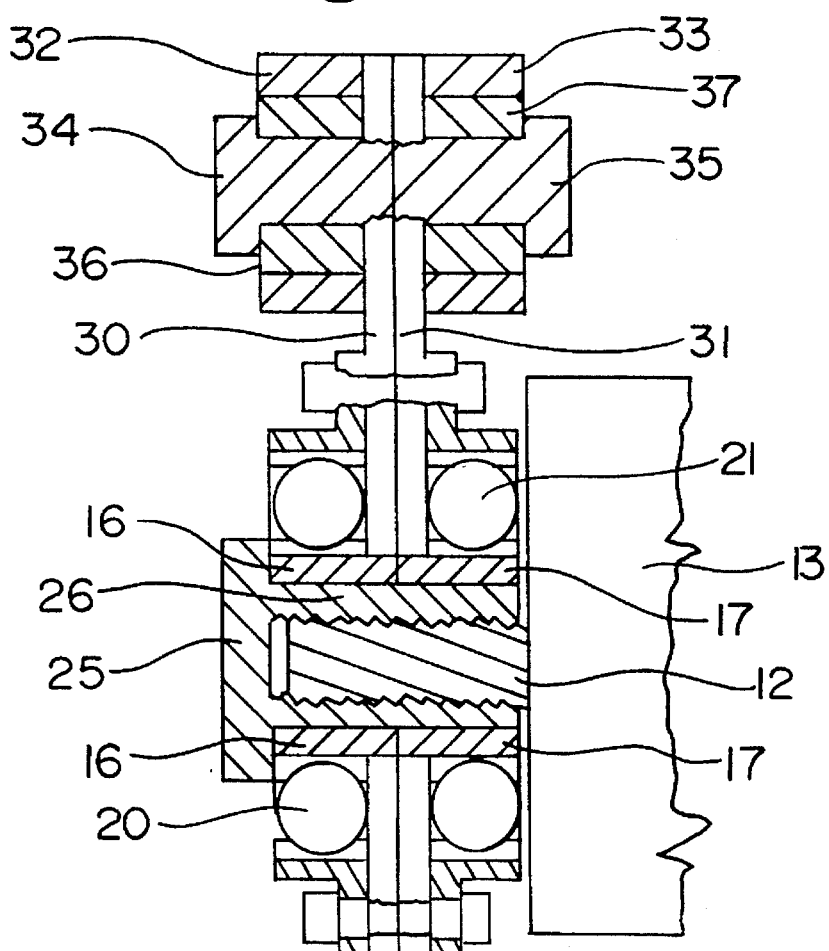
FIG. 2 is a sectional view along the line 2—2 in FIG. 1.

As is customary in conventional angle grinders, the drive shaft is threaded externally with a left hand thread and as seen in FIG. 2 the retainer nut 25 has a mating internal thread and a spigot portion 26 passing through the central bore of the eccentrics 16 and 17. The head of the nut 25 also extends radially an extent sufficient to engage the bearing assembly 20 of the outer cutting member 10 thereby also retaining the bearings 20 and 21 and the cutting members 10 and 11 attached thereto in assembly on the eccentrics 16 and 17.

Each of the cutting members 10 and 11 has an extension 30 and 31 respectively to which respective pivot pins 34 and 35 are non-rotatably attached. The pivot pins 34 and 35 are received in bearing bushes 36 and 37 rotatably mounted in respective links 32 and 33. The other ends of each of the links 32 and 33 are pivoted on a common pivot pin 38 to the bracket 15 forming part of the gearbox 13.

The major extent of the cutting edge of the cutting members 10 and 11 is a segment of a circle based on the axis of the pivot pins 34 and 35 respectively, as indicated at 10a in respect of cutting member 10 in FIG. 1. One end portion of the cutting edge of the cutting member 10 is substantially straight as indicated at 10b and extends generally in a direction parallel to the common axial plane of the shaft 12 and pivot pin 34, whilst at the opposite end of the cutting member 10 there is a relatively sharply radiused cutting edge section 10c. It is to be understood that the cutting edge configuration of the cutting member 11 is the same as that above described with respect to the cutting member 10.

It is to be understood that the edge of the respective cutting members upon which the cutting teeth are provided is not necessarily arcuate, but can be of other curved form, or even straight.

Figure 2A:
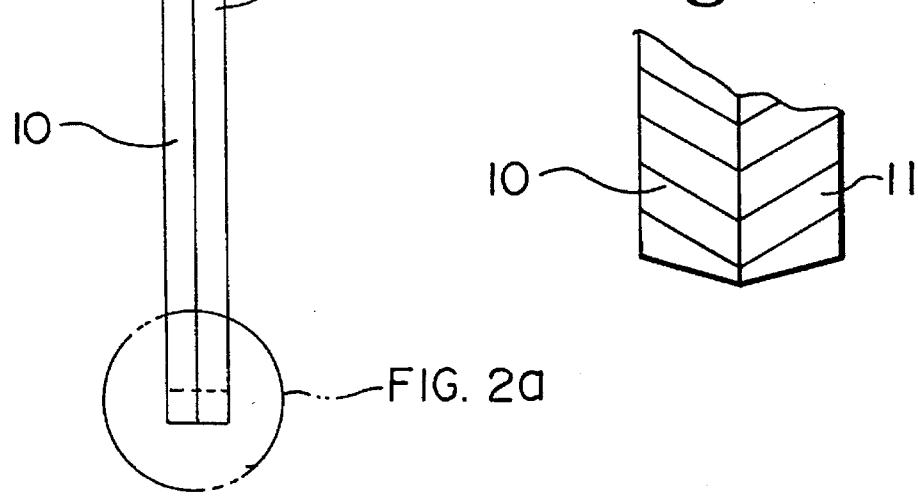
FIG. 2a is an enlarged view of the distal end of the cutting members shown in the encircled area depicting the angle of inclination of the cutting teeth of the abutting faces of the cutting members

Along each of the above referred to three sections 10a, 10b and 10c of the cutting edge of each cutting member are a plurality of substantially conventional saw teeth as seen in FIG. 1. It is preferable that the leading or cutting edge of the teeth are slightly inclined across the edge of the cutting member so that the teeth on the respective cutting members are each forwardly inclined towards the inner face of the cutting member, that is the abutting faces of the cutting members when they are assembled side by side as seen in FIG. 2a.

This inclination of the cutting edge results in a force being generated during the cutting action which resists the spreading apart of the cutting members. The angle of inclination of the cutting edge is selected so that the required force is generated to prevent spreading apart of the respective cutting members without developing undue frictional forces between the cutting elements as they move relative to one another. A suitable angle of inclination of the cutting teeth is 5° to 10°. Also the inclination may be applied to only some of the teeth of one or each cutting member, spaced along the length thereof.

It will be noted that the edge portion 10d of the cutting member 10 extends back from the extremity of the toothed edge portion 10c so as to provide relief behind the cutting edge section 10c. Thus, in use, the portion 10c of the cutting edge can be used to make a "plunge cut", that is the cut may be commenced in a surface at any location spaced inwardly from the respective edges of the surface, which is particularly advantageous when cutting an opening in a member or structure. In a modified form of the cutting member the cutting teeth may be provided along the portion 10d so that when the end portion 10c is used to make a plunge cut, that cut can then be extended in either or both directions by use of toothed portions 10a and 10d.

In a particular form of the cutting members suitable for plunge cuts, the cutting member has a short cutting edge, replacing cutting edge portion 10a, and with a cutting edge at each end substantially at right angles thereto similar to portion 10b. This is particularly suitable for performing deep plunge cuts and extending the cut laterally in either of two opposite directions.

Figure 3:
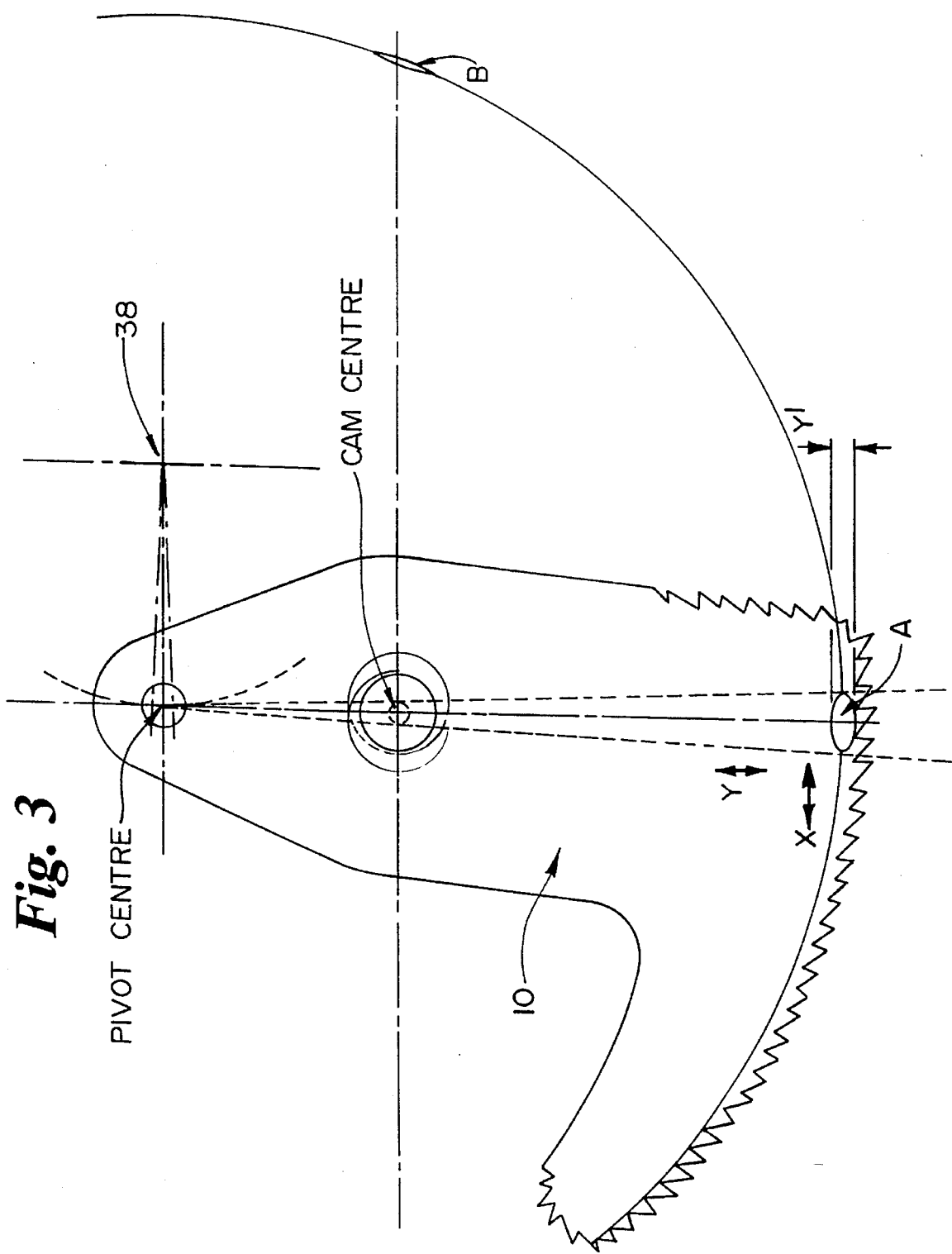
FIG. 3 is a diagram explaining the movements of the cutting elements of the tool shown in FIG. 1.

FIG. 3 of the drawings shows diagrammatically the two movements to which the cutting members are subjected, the first being a substantially linear movement in the direction Y limited in extent to equal the eccentricity of the eccentrics, and in direction by the pivotal action of the links 32 or 33 about the axis 38. The other movement is an arcuate movement in the direction X, about the axis of the pivot pins 34 and 35 generated by the rotation of the eccentrics 16 and 17. The combined effect of these two movements is that each tooth on the cutting edge of the cutting members describes an oval or elliptical-like movement during each complete rotation of the eccentric upon which it is mounted.

The combined effect of these two movements is to impart to each tooth of the respective cutting members an oval or elliptical-like path of movement. The actual path varying dependent on the location of the tooth in relation to the axis of rotation of the drive shaft 12 carrying the eccentric journals 16 and 17, and to the pivot axis 38 of the links 32 and 33. This variation can be seen by comparing the plots of the tooth path as shown at A and B in FIG. 3. The small extent of lift of the teeth in relation to the direction of length of the cutting stroke, as seen at B, renders this area of the cutting member suitable for cutting material such as metal where relatively short teeth are used. The high lift area of the cutting member as seen at A is particularly suitable for cutting materials such as wood, stone or concrete, where longer spaced deep teeth are used. The high lift is particularly suitable for cutting stone or concrete where an impact action assists the cutting process.

The provision of two cutting members operating out of phase by 180° results in a balancing of the dynamic forces resulting from the oscillatory movements of the respective cutting members.

It will further be appreciated from FIG. 3 that by selection of a suitable shape of the toothed edge of the cutting members different portions of the toothed edge can be provided with different tooth configurations and sizes. Thus different portions of the same toothed edges can be used for cutting different materials.

The cutting tool constructed in accordance with the present invention can be used as a replacement for a conventional circular or reciprocating saw, and has a number of advantages thereover. In particular it is substantially safer in use than a circular saw due to the reduced length of the cutting edge, the engagement of the majority of the cutting edge with the workpiece and hence reduced exposure of the cutting edge when in use, and the dual blade reciprocation cutting action.

It is to be understood that the above discussion is based on the configuration shown in FIG. 3, wherein the respective positions on the cutting edge are on the same radius from the centre of the eccentric, however, as seen in FIG. 1, the specific shape of the cutting edge of the cutting elements therein have differing radii from the centre of rotation of the eccentric and thus as the radius increases, the major axis of the elliptical path will increase but will not influence the minor axis.

The cutting tool as illustrated can be used anywhere that a conventional circular or reciprocating saw can be used and can be used to cut all materials including timber, concrete, bricks or metals. Preferably the tooth form is selected to suit different materials and in particular a small tooth is preferred for cutting metals. When smaller teeth are used, a smaller oscillatory movement of the cutter elements may also be used. The toothed portion of the cutter elements can be of conventional cutting grade hardened steel and can be tipped with known high hardness materials.

The claims defining the invention are as follows:

1. A cutting tool comprising:

two juxtaposed cutting members each having a toothed cutting edge of a substantially same shape and extent, each of said cutting members having a drive portion extending in a direction lateral to the cutting edge, said drive portions being in a juxtaposed relation;

a drive means adapted for coupling to a motor and operably interacting with each said drive portions to impart thereto an eccentric movement in a plane of each respective said drive portion about a common axis, the eccentric movement imparted to the respective drive portions being equal and angularly out of phase; and means to restrain movement of the respective drive portions at a specific location spaced from said common axis to substantially linear movement in a direction radial to the common axis and to angular movement about a respective pivot axis parallel to said common axis, whereby in response to activation of the drive means, the cutting edge of each cutting member prescribes simultaneously in a plane of the cutting member simultaneous oscillatory movements in the direction of the cutting edge and in a direction substantially at right angles to the cutting edge, the corresponding movements of the respective cutting members being out of phase, and the teeth of each cutting edge being adapted to each cut when moving individually in one direction in the direction of extent of the cutting edge.

2. A cutting tool as claimed in claim 1 wherein a major portion of the cutting edge of each cutting member is a segment of a circle having an axis substantially co-incident with the respective pivot axis of the drive portion of said cutting member.

3. A cutting tool as claimed in any one of claims 1 or 2 wherein each said cutting member is substantially planar with the drive portion extending laterally to the cutting edge intermediate a length of said cutting edge.

4. A cutting tool as claimed in claim 1 or 2, wherein said means to restrain movement includes a pair of links each pivotally supported at one end about a fixed axis parallel to said common axis, each of said links being pivotally connected at a second end to a respective one of said drive portions about said respective pivot axis parallel to and spaced from said common axis to establish said substantially linear movement.

5. A cutting tool as claimed in any one of the claims 1 or 2 wherein at the same end of the cutting edge of each said cutting member there is a substantially straight extension of the cutting edge extending in a direction inwardly with respect to the arcuate portion.

6. A cutting tool as claimed in claim 2 wherein at the same end of each arcuate shaped cutting edge of each said cutting member, there is a portion of the cutting edge of a reenterant curved shape.

7. A cutting tool as claimed in claim 1 or 2 wherein said common axis of the eccentric movement is located between said means to restrain movement of the respective drive portions and the cutting edge of the respective cutting members.

8. A cutting tool as claimed in claim 7, wherein said means to restrain movement includes a pair of links each pivotally supported at one end about a fixed axis parallel to said common axis, each of said links being pivotally connected at a second end to a respective pivot one of said drive portions about said respective axis parallel to and spaced from said common axis to establish said substantially linear movement.

9. A cutting tool as claimed in claim 8 wherein at the same end of each arcuate shaped cutting edge of each said cutting member, there is a portion of the cutting edge of a reenterant curved shape.

10. A cutting tool as claimed in claim 7 wherein each said cutting member is substantially planar with the drive portion extending laterally to the cutting edge intermediate a length of said cutting edge.

11. A cutting tool as claimed in claim 7, wherein each said cutting member is mounted on a respective one of a pair of eccentrics mounted to rotate on said common axis, the respective eccentrics being 180° out of phase, and coupled to the drive means to rotate in unison.

12. A cutting tool as claimed in claim 11 wherein at the same end of the cutting edge or each said cutting member there is a substantially straight extension of the cutting edge extending in a direction inwardly with respect to the arcuate portion.

13. A cutting tool as claimed in claim 11 wherein each said cutting member is substantially planar with the drive portion extending laterally to the cutting edge intermediate a length of said cutting edge.

14. A cutting tool as claimed in claim 11 wherein at the same end of each arcuate shaped cutting edge of each said cutting member, there is a portion of the cutting edge of a reenterant curved shape.

15. A cutting tool as claimed in claim 11 wherein each said toothed cutting edge has a plurality of teeth, said plurality of teeth of at least one cutting member having a cutting edge inclined to the direction of the toothed edge of the other said cutting member whereby a leading end of the inclined cutting edge is adjacent the other cutting member.

16. A cutting tool as claimed in claim 11 wherein corresponding sections of each toothed cutting edge have teeth of a pitch different from a remainder of the toothed edge.

17. A cutting tool as claimed in claim 1 or 2, wherein each said cutting member is mounted on a respective one of a pair of eccentrics mounted to rotate on said common axis, the respective eccentrics being 180° out of phase and coupled to the drive means to rotate in unison.

18. A cutting tool as claimed in claim 17 wherein each said cutting member is substantially planar with the drive portion extending laterally to the cutting edge intermediate a length of said cutting edge.

19. A cutting tool as claimed in claim 18 wherein at the same end of each arcuate shaped cutting edge of each said cutting member, there is a portion of the cutting edge of a reenterant curved shape.

20. A cutting tool as claimed in claim 18 wherein at the same end of the cutting edge or each said cutting member there is a substantially straight extension of the cutting edge extending in a direction inwardly with respect to the arcuate portion.

21. A cutting tool as claimed in claim 18 wherein each said toothed cutting edge has a plurality of teeth, said plurality of teeth of at least one cutting member having a cutting edge inclined to the direction of the toothed edge of the other said cutting member whereby a leading end of the inclined cutting edge is adjacent the other cutting member.

22. A cutting tool as claimed in claim 18 wherein corresponding sections of each toothed cutting edge have teeth of a pitch different from a remainder of the toothed edge.

23. A cutting tool as claimed in claim 17, wherein said means to restrain movement includes a pair of links each pivotally supported at one end about a fixed axis parallel to said common axis, each of said links being pivotally connected at a second end to a respective pivot one of said drive portions about said respective axis parallel to and spaced from said common axis to establish said substantially linear movement.

24. A cutting tool as claimed in claim 23 wherein each said toothed cutting edge has a plurality of teeth, said plurality of teeth of at least one cutting member having a cutting edge inclined to the direction of the toothed edge of the other said cutting member whereby a leading end of the inclined cutting edge is adjacent the other cutting member.

25. A cutting tool as claimed in claim 23 wherein at the same end of the cutting edge or each said cutting member there is a substantially straight extension of the cutting edge extending in a direction inwardly with respect to the arcuate portion.

26. A cutting tool as claimed in claim 23 wherein corresponding sections of each toothed cutting edge have teeth of a pitch different from a remainder of the toothed edge.

27. A cutting tool comprising two juxtaposed cutting members each having a toothed cutting edge of arcuate shape along a major portion of a length of each said cutting member; respective coupling means to drive couple each cutting member to a motor so the cutting edges thereof describe an oscillatory movement about an axis of said arcuate shaped portion of that cutting edge in both a direction of length of the cutting edge and a direction radial to the cutting edge, said coupling means of each cutting member also being arranged so both cutting edges describe said oscillatory movements out of phase with respect to each other, and said cutting teeth of both cutting members being arranged to cut when individually moving in the direction of the length of the cutting edge.

28. A cutting tool as claimed in claim 27 wherein at a same end of the cutting edge of each said cutting member there is a substantially straight extension of the cutting edge extending in a direction inwardly with respect to the arcuate portion.

29. A cutting tool as claimed in any one of claims 1, 2 or 27 wherein each said cutting edge has a plurality of teeth, said plurality of the cutting teeth of at least one cutting member having a cutting edge inclined to the direction of the toothed edge of the other said cutting member whereby a leading end of the inclined cutting edge is adjacent the other cutting member.

30. A cutting tool as claimed in any one of claims 2 or 27 wherein corresponding sections of each toothed cutting edge have teeth of a pitch different from a remainder of the toothed edge.

* * * * *

UNITED STATES PATENT AND TRADEMARK OFFICE
CERTIFICATE OF CORRECTION

PATENT NO. : 5,456,011
DATED : October 10, 1995
INVENTOR(S) : Kevin Ross Inkster It is certified that error appears in the above-indentified patent and that said Letters Patent is hereby corrected as shown below:

Column 2, line 18: change "members" to -- members. --

Column 3, line 4: change "Which" to -- which --

Column 3, line 43: change "Cutting" to -- cutting --

Column 5, line 3: change "the" to -- a --

Column 5, line 46: change "respective axis" to -- respective pivot axis --

Column 6, line 48: change "respective pivot one" to -- respective one --

Signed and Sealed this

Eighteenth Day of June, 1996

Attest:

BRUCE LEHMAN

Attesting Officer     Commissioner of Patents and Trademarks